United States Patent
Grimm

(10) Patent No.: US 12,065,367 B2
(45) Date of Patent: Aug. 20, 2024

(54) VOLATILE FATTY ACID CONTROL

(71) Applicant: ECOLAB USA INC., St. Paul, MN (US)

(72) Inventor: Herman Mark Grimm, Stanley, NC (US)

(73) Assignee: ECOLAB USA Inc., St. Paul, MN (US)

( * ) Notice: Subject to any disclaimer, the term of this patent is extended or adjusted under 35 U.S.C. 154(b) by 109 days.

(21) Appl. No.: 17/721,637

(22) Filed: Apr. 15, 2022

(65) Prior Publication Data

US 2022/0340458 A1    Oct. 27, 2022

Related U.S. Application Data

(60) Provisional application No. 63/178,730, filed on Apr. 23, 2021.

(51) Int. Cl.
| | |
|---|---|
| C02F 1/58 | (2023.01) |
| C02F 1/50 | (2023.01) |
| C02F 1/68 | (2023.01) |
| D21H 21/36 | (2006.01) |
| C02F 101/32 | (2006.01) |
| C02F 103/28 | (2006.01) |
| D21H 21/02 | (2006.01) |

(52) U.S. Cl.
CPC ............ *C02F 1/58* (2013.01); *C02F 1/50* (2013.01); *C02F 1/683* (2013.01); *D21H 21/36* (2013.01); *C02F 2101/322* (2013.01); *C02F 2103/28* (2013.01); *C02F 2209/12* (2013.01); *C02F 2209/22* (2013.01); *D21H 21/02* (2013.01)

(58) Field of Classification Search
None
See application file for complete search history.

(56) References Cited

U.S. PATENT DOCUMENTS

| | | |
|---|---|---|
| 3,375,200 A | 3/1968 | Robertson |
| 3,909,408 A | 9/1975 | Ishida et al. |
| 4,115,188 A * | 9/1978 | O'Brien ............ D21F 1/82 |
| | | 162/190 |

(Continued)

FOREIGN PATENT DOCUMENTS

| | | |
|---|---|---|
| AU | 494329 B2 | 9/1977 |
| DE | 4128510 A1 | 3/1993 |

(Continued)

OTHER PUBLICATIONS

Ashrafi et al. (Journal of Environmental Management, 2015, 158, 146-157). (Year: 2015).*

(Continued)

*Primary Examiner* — Clare M Perrin
(74) *Attorney, Agent, or Firm* — Eric D. Babych; Barnes & Thornburg LLP

(57) ABSTRACT

A method of controlling a volatile fatty acid in an aqueous industrial system is provided in the present disclosure. The method includes determining a level of dissolved oxygen in process water in the aqueous industrial system and adding an effective amount of a control agent to the process water if the determined level of dissolved oxygen is above a predetermined level. The compositions and methods can lower the amount of VFA present in the aqueous industrial system.

20 Claims, 5 Drawing Sheets

(56) References Cited

U.S. PATENT DOCUMENTS

| | | | |
|---|---|---|---|
| 4,208,245 A | | 6/1980 | Watkins et al. |
| 4,274,913 A | * | 6/1981 | Kikuiri .................... D21C 7/08 |
| | | | 162/57 |
| 5,326,479 A | | 7/1994 | Sarkar et al. |
| 5,444,078 A | * | 8/1995 | Yu .......................... A01N 25/04 |
| | | | 210/764 |
| H1690 H | | 11/1997 | Nye |
| 6,140,130 A | | 10/2000 | Salmen et al. |
| 6,447,644 B1 | * | 9/2002 | Seltzer .................. C07D 211/94 |
| | | | 162/81 |
| 6,998,015 B2 | | 2/2006 | Hua et al. |
| 7,949,432 B2 | | 5/2011 | Rice |
| 8,916,050 B2 | | 12/2014 | de Rijk |
| 10,258,920 B1 | | 4/2019 | Bader |
| 2006/0054290 A1 | | 3/2006 | Call |
| 2013/0319627 A1 | * | 12/2013 | Van Haute ............... D21C 3/20 |
| | | | 162/161 |
| 2017/0175333 A1 | * | 6/2017 | Tu .......................... D21H 17/28 |
| 2017/0233950 A1 | | 8/2017 | Haehnle et al. |
| 2019/0316297 A1 | * | 10/2019 | Silva .................... D21H 25/005 |
| 2021/0253447 A1 | * | 8/2021 | Barak .................... A01N 59/00 |

FOREIGN PATENT DOCUMENTS

| | | |
|---|---|---|
| EP | 0302122 B1 | 5/1993 |
| EP | 1467017 A1 | 10/2004 |
| EP | 1849803 A1 | 10/2007 |
| EP | 1268217 B1 | 7/2011 |
| WO | 1998059108 A2 | 12/1998 |
| WO | 2003062149 A2 | 7/2003 |
| WO | 2003092919 A1 | 11/2003 |
| WO | 2011085067 A1 | 7/2011 |
| WO | 2014149302 A1 | 9/2014 |
| WO | 2019221694 A1 | 11/2019 |
| WO | 2020161171 A1 | 8/2020 |

OTHER PUBLICATIONS

Coles et al. (Marine Biology, 1977, 43, 209-216). (Year: 1977).*

YSI Model 51A manual (pp. 1-19). (Year: 1995).*

Millet et al. (Journal of Animal Science, 1973, 37, pp. 599-607). (Year: 1973).*

Kang et al. ("Targeting cellular metabolism to inhibit synergistic biofilm formation of multi-species isolated from a cooling water system" published Jan. 28, 2021 at https://doi.org/10.1101/2021.01.28.428600, pp. 1-24). (Year: 2021).*

Dissolved Oxygen Fact Sheet, 2004, pp. 1-5. (Year: 2004).*

Haq, I., Raj, A. (2020). Pulp and Paper Mill Wastewater: Ecotoxicological Effects and Bioremediation Approaches for Environmental Safety. In: Bharagava, R., Saxena, G. (eds) Bioremediation of Industrial Waste for Environmental Safety. Springer, Singapore. https://doi.org/10.1007/978-981-13-3426-9_14.

International Search Report and Written Opinion for International Application No. PCT/US2020/044174, mailed Jan. 15, 2021, 23 pages.

Pramudono, B. & Aji, Hapsoro & Priyanto, S. & Kusworo, Tutuk & Suherman, Suherman & Untoro, E. & Ratu, P.. (2018). Utilization of biomass waste of pulp and paper industry for production of sodium lignosulphonate (SLS). Nature Environment and Pollution Technology. 17. 1299-1303.

Singh AK, Chandra R. Pollutants released from the pulp paper industry: Aquatic toxicity and their health hazards. Aquat Toxicol. Jun. 2019; 211:202-216. doi: 10.1016/j.aquatox.2019.04.007. Epub Apr. 10, 2019. PMID: 31029991.

Pereira, Maria & Vieira, Maria & Beleza, Vitorino & Melo, Luis. (2001). Comparison of Two Biocides—Carbamate and Glutaraldehyde—in the Control of Fouling in Pulp and Paper Industry. Environmental technology. 22. 781-90.10.1080/095933322086180318.

* cited by examiner

VOLATILE FATTY ACID CONTROL

BACKGROUND

1. Field of the Invention

The present disclosure generally relates to controlling volatile fatty acids (VFA) using dissolved oxygen and/or process water conductivity sensors.

2. Description of the Related Art

Papermaking slurries often contain sulfite. In some instances, the sulfite may be derived from a bleaching process or it may have been added intentionally to deactivate oxidizing biocides prior to dye addition. Broke chests are a frequent problem area for microbial control in papermaking systems and non-oxidizing biocides are frequently added to gain control. Broke slurries may contain high concentrations of facultative anaerobes as a result of poor microbial control. These anaerobes produce odorous fatty acid fermentation products, i.e., VFA, which can impart undesirable odors and produce dangerous concentrations of organic gases.

To remove VFAs from process water, processes typically rely on aeration to increase the dissolved oxygen content in the water. It is generally believed that increasing dissolved oxygen in process water leads to lower levels of VFAs.

BRIEF SUMMARY

A method of controlling a volatile fatty acid in an aqueous industrial system is provided in the present disclosure. The method includes determining a level of dissolved oxygen in process water in the aqueous industrial system; and adding an effective amount of a control agent to the process water, if the determined level of dissolved oxygen is above a predetermined level. The control agent is selected from the group consisting of a biocide, sodium bisulfite, a carbamate, and any combination thereof.

In some aspects, the method includes (a) inserting a probe into the aqueous industrial system; (b) contacting the probe with the process water; (c) measuring the dissolved oxygen in the process water to obtain an input signal; (d) transmitting the input signal to a controller; (e) converting the input signal into a numerical value representing a level of dissolved oxygen in the process water; and (f) adding an effective amount of the control agent to the process water, if the level of dissolved oxygen is above the predetermined level.

In some aspects, the predetermined level is from about 100 ppm to about 10,000 ppm.

In some aspects, the volatile fatty acid is selected from the group consisting of formic acid, acetic acid, butyric acid, propionic acid, isobutyric acid, valeric acid, isovaleric acid, and any combination thereof.

In some aspects, a paper mill comprises the aqueous industrial system.

In some aspects, the control agent is added to a stream selected from the group consisting of a pulp slurry, a process water, a shower water, a thick stock, and any combination thereof.

In some aspects, the control agent is added to a location selected from the group consisting of a water clarifier inlet, a water clarifier outlet, a stock tank, a machine chest, a head box inlet stream, a recovered stock tank, a machine water tank, a save all, and any combination thereof.

In some aspects, the paper mill is a recycled packaging paper mill.

In some aspects, the paper mill comprises a closed water loop.

In some aspects, the control agent is added to the process water in the closed water loop.

In some aspects, the control agent inhibits the formation of the volatile fatty acid in the aqueous industrial system as compared to an aqueous industrial system that was not treated with the control agent, and wherein the volatile fatty acid is selected from the group consisting of formic acid, acetic acid, butyric acid, propionic acid, isobutyric acid, valeric acid, isovaleric acid, and any combination thereof.

In some aspects, the formation of the volatile fatty acid is inhibited by 100%.

In some aspects, the volatile fatty acid is produced by a bacteria.

In some aspects, the method includes adding a chelant to the process water, wherein the chelant is selected from the group consisting of ethylenediamine, ethylenediamine tetraacetic acid (EDTA), a porphyrin, a porphine derivative, diethylene-triamine-pentaacetic acid (DTPA), ethylene glycol bis(2-aminoethyl ether)-N, N, N',N'-tetraacetic acid (EGTA), diethylenetriaminepentaacetic acid (DTPA), N-(2-Hydroxyethyl) ethylene diamine-N,N',N'-triacetic acid (HEDTA), polyacrylic acid (PAA), boric acid (BA), sodium tripolyphosphate (STP), an alkoxyacetic acid, trimercaptotriazine, potassium thiocarbonate, sodium thiocarbonate, a dithiocarbamate, and any combination thereof.

In some aspects, the effective amount is from about 1 ppm to about 500 ppm.

In some aspects, the effective amount is from about 200 ppm to about 500 ppm.

In some aspects, the control agent consists essentially of a biocide, sodium bisulfite, a carbamate, or a mixture thereof.

In some aspects, the process water is not aerated or contacted with an oxygen enriched gas mixture.

In other aspects, a method of controlling a volatile fatty acid in an aqueous industrial system is provided. The method includes determining conductivity of process water in the aqueous industrial system; and adding an effective amount of a control agent to the process water, if the determined level of the conductivity is above a predetermined level. The control agent is selected from the group consisting of a biocide, sodium bisulfite, a carbamate, and any combination thereof.

A method of monitoring and controlling volatile fatty acid content in process water is provided. The method includes (a) providing a monitoring and controlling unit comprising a controller and a dissolved oxygen sensor in communication with the controller, wherein the dissolved oxygen sensor is operable to measure dissolved oxygen of the process water; (b) providing a chemical injection pump, which is in communication with the controller; (c) inputting an acceptable range for the dissolved oxygen to be measured into the controller; (d) providing a delivery conduit having a first end submerged in the process water and a second end connected to an inlet of the monitoring and controlling unit; (e) delivering a sample of the process water through the delivery conduit into the monitoring and controlling unit; (f) measuring the dissolved oxygen of the sample of the process water with the dissolved oxygen sensor; (g) determining if the measured dissolved oxygen of the sample of process water is within the acceptable range inputted into the controller in step (c); (h) causing a change in an influx of a control agent into the process water from the chemical injection pump if the measured dissolved oxygen is outside of the acceptable range inputted into the controller in step (c), the control agent being capable of adjusting the dissolved oxygen in the process water within the acceptable range; and (i) optionally repeating steps (a) to (g) to determine if the dissolved oxygen has been brought within the acceptable range inputted in step (c).

Still further, another method of monitoring and controlling volatile fatty acid content in process water is provided. The method includes (a) providing a monitoring and controlling unit comprising a controller and a conductivity sensor in communication with the controller, wherein the conductivity sensor is operable to measure conductivity of the process water; (b) providing a chemical injection pump, which is in communication with the controller; (c) inputting an acceptable range for the conductivity to be measured into the controller; (d) providing a delivery conduit having a first end submerged in the process water and a second end connected to an inlet of the monitoring and controlling unit; (e) delivering a sample of the process water through the delivery conduit into the monitoring and controlling unit; (f) measuring the conductivity of the sample of the process water with the conductivity sensor; (g) determining if the measured conductivity of the sample of process water is within the acceptable range inputted into the controller in step (c); (h) causing a change in an influx of a control agent into the process water from the chemical injection pump if the measured conductivity is outside of the acceptable range inputted into the controller in step (c), the control agent being capable of adjusting the conductivity in the process water within the acceptable range; and (i) optionally repeating steps (a) to (g) to determine if the conductivity has been brought within the acceptable range inputted in step (c).

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1:
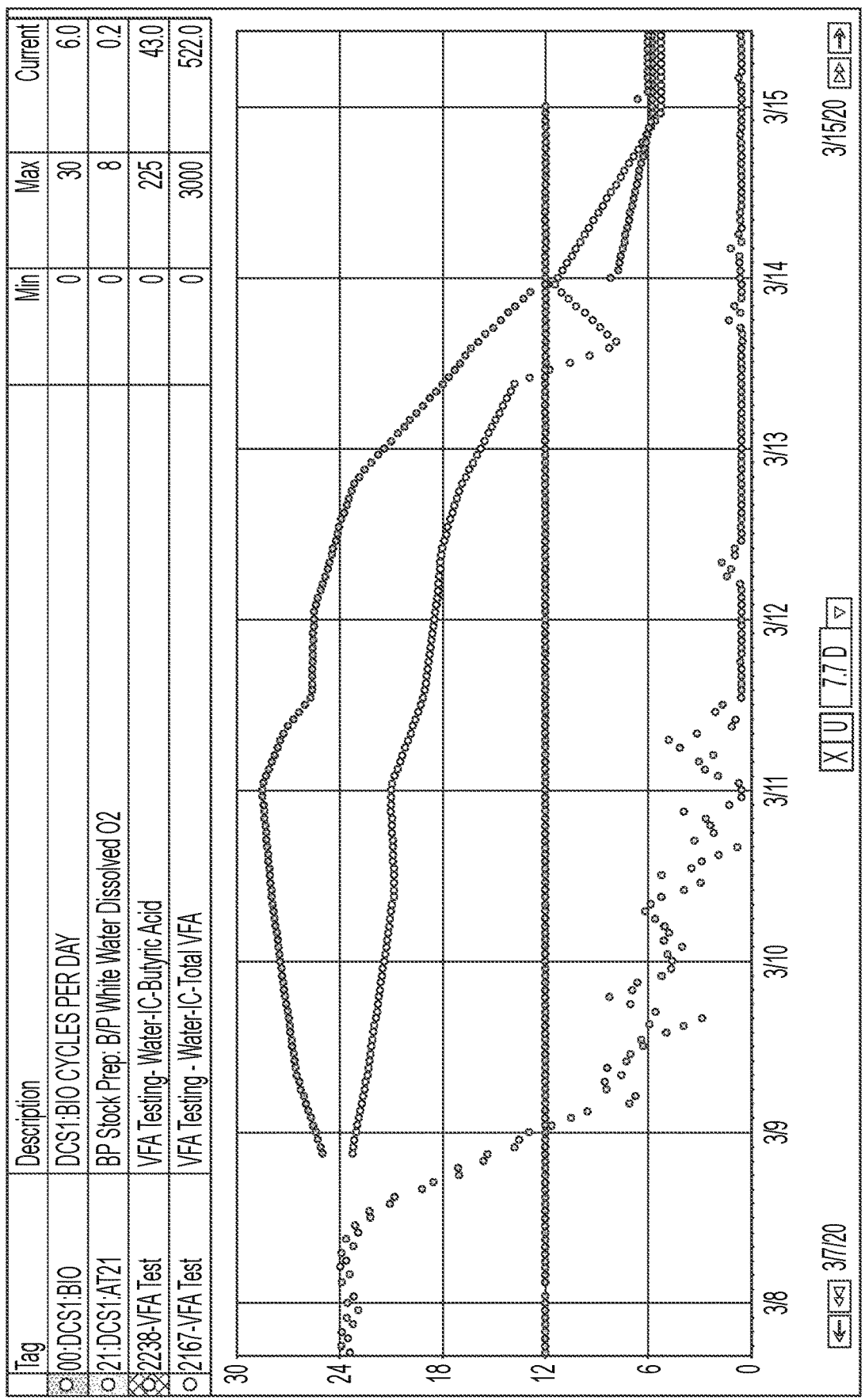
FIG. 1 shows VFA concentration and dissolved oxygen concentration as a control agent is added to the water.

Various embodiments are described below. However, embodiments are not limited to those explicitly described herein and may include, for example, derivatives, variations, and/or modifications of specific embodiments described herein.

It is generally believed that increasing dissolved oxygen in process water leads to lower levels of VFAs. Increasing dissolved oxygen in process water usually involves a form of aeration. However, the present disclosure demonstrates that decreasing dissolved oxygen using certain control agents leads to a decrease in VFA concentration in the process water. Alternatively or in combination with monitoring dissolved oxygen, the conductivity can be measured and the control agent can be dosed based on the measured conductivity to lower VFA concentration.

In some embodiments, the present disclosure provides methods for converting rich bacteria environments from acid-producing bacteria environments to nitrate-reducing bacteria environments. These environments may be found, for example, in industrial process water. The inventor determined that the addition of a control agent to the process water based on the measured dissolved oxygen level and/or conductivity can reduce the amount of VFA in the process water. The inventive process may also reduce, inhibit the growth of, eliminate, or substantially eliminate VFA in any product, such as paper, made from the industrial process.

In accordance with the present disclosure, the term "volatile fatty acid" or "VFA" includes acids such as, but not limited to, formic acid, acetic acid, butyric acid, propionic acid, isobutyric acid, valeric acid, isovaleric acid, and any combination thereof. In some embodiments, the VFA is selected from the group consisting of acetic acid, butyric acid, and propionic acid. The methods of the present disclosure can reduce, inhibit the growth of, eliminate, or substantially eliminate any or all VFA in process water by utilizing the control agent.

A method of controlling a volatile fatty acid in an aqueous industrial system is provided in the present disclosure. The method includes determining a level of dissolved oxygen in process water in the aqueous industrial system; and adding an effective amount of a control agent to the process water, if the determined level of dissolved oxygen is above a predetermined level.

Determining the level of dissolved oxygen in the process water can be accomplished using sensors that measure dissolved oxygen directly or by measuring a property of the water from which dissolved oxygen concentration can be inferred. The sensor for measuring the dissolved oxygen is not particularly limited and can be an optical sensor, polarographic sensor, or any other sensor known for detecting dissolved oxygen levels. For purposes of this application sensor and probe will be used interchangeably.

For example, dissolved oxygen can be determined by inserting a probe into the aqueous industrial system so that the probe contacts the process water. Once in contact with the process water, the probe measures the dissolved oxygen and generates an input signal. The input signal is then transmitted a controller and converted into a numerical value representing a level of dissolved oxygen in the process water. The controller compares the measured dissolved oxygen level with a predetermined value for the dissolved oxygen. If the dissolved oxygen level is higher than the predetermined value then the controller sends a signal to a chemical injection pump. The chemical injection pump then adds an effective amount of the control agent to the process water.

The predetermined level of dissolved oxygen can be a value that correlates with a maximum allowable VFA concentration. The predetermined level of dissolved oxygen can be about 1 ppm, about 2 ppm, about 3 ppm, about 4 ppm, about 5 ppm, about 6 ppm, about 7 ppm, about 8 ppm, about 9 ppm, or about 10 ppm. The predetermined level of dissolved oxygen can be any value ranging from about 1 ppm to about 10 ppm, from about 1 ppm to about 15 ppm, from about 1 ppm to about 20 ppm, or from about 1 ppm to about 100 ppm. In some aspects, the predetermined level is from about 100 ppm to about 10,000 ppm.

The control agent can be a biocide, sodium bisulfite, a carbamate, or any combination thereof. In some aspects, the control agent is a biocide.

Biocides suitable for use may be oxidizing or non-oxidizing biocides. Oxidizing biocides include, but are not limited to, bleach, chlorine, bromine, chlorine dioxide, and materials capable of releasing chlorine and bromine. Non-oxidizing biocides include, but are not limited to, glutaraldehyde, isothiazolin, 2,2-dibromo-3-nitrilopropionamide, 2-bromo-2-nitropropane-1,3 diol, 1-bromo-1-(bromomethyl)-1,3-propanedicarbonitrile, tetrachloroisophthalonitrile, alkyldimethylbenzylammonium chloride, dimethyl dialkyl ammonium chloride, didecyl dimethyl ammonium chloride, poly(oxyethylene(dimethyliminio)ethylene(dimethyliminio)ethylene dichloride, methylene bisthiocyanate, 2-decylthioethanamine, tetrakishydroxymethyl phosphonium sulfate, dithiocarbamate, cyanodithioimidocarbonate, 2-methyl-5-nitroimidazole-1-ethanol, 2-(2-bromo-2-nitroethenyl)furan, beta-bromo-beta-nitrostyrene, beta-nitrostyrene, beta-nitrovinyl furan, 2-bromo-2-bromomethyl glutaronitrile, bis(trichloromethyl) sulfone, S-(2-hydroxypropyl)thiomethanesulfonate, tetrahydro-3,5-dimethyl-2H-1,3,5-hydrazine-2-thione, 2-(thiocyanomethylthio)benzothiazole, 2-bromo-4'-hydroxyacetophenone, 1,4-bis (bromoacetoxy)-2-butene, bis(tributyltin)oxide, 2-(tert-butylamino)-4-chloro-6-(ethylamino)-s-triazine, dodecylguanidine acetate, dodecylguanidine hydrochloride, coco alkyldimethylamine oxide, n-coco alkyltrimethylenediamine, tetra-alkyl phosphonium chloride, 7-oxabicyclo [2.2.1]heptane-2,3-dicarboxylic acid, 4,5-dichloro-2-n-octyl-4-isothiazoline-3-one, 5-chloro-2-methyl-4-isothiazolin-3-one and 2-methyl-4-isothiazolin-3-one.

Suitable non-oxidizing biocides also include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitriloproplonamide (DBNPA)), sulfur compounds (e.g., isothiazolone, carbamates, and metronidazole), and quaternary phosphonium salts (e.g., tetrakis(hydroxymethyl)-phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxycarboxylic acid, peroxycarboxylic acid composition, and peroxides.

In some aspects, the control agent is a carbamate. Suitable carbamates include, but are not limited to, dimethyldithiocarbamate or salts thereof, ethylenebis(dithiocarbamic acid) or salts thereof. In some aspects, the carbamate is potassium dimethyldithiocarbamate, sodium dimethyldithiocarbamate, disodium ethylenebis(dithiocarbamic acid), or combinations thereof. In some aspects, the carbamate is potassium dimethyldithiocarbamate. In some aspects, the carbamate is sodium dimethyldithiocarbamate. In some aspects, the carbamate is disodium ethylenebis(dithiocarbamic acid). In some aspects, the carbamate is a mixture of disodium ethylenebis(dithiocarbamic acid) and sodium dimethyldithiocarbamate.

In some aspects, the control agent is a bisulfite salt such as sodium bisulfite.

In some embodiments, the effective amount of control agent added to the process water may be selected to ensure that the process water reaches a predetermined level of dissolved oxygen or conductivity. In some aspects, the effective amount is from about 1 ppm to about 5,000 ppm. In some aspects, the effective amount is from about 1 ppm to about 500 ppm. For example, an effective amount of the control agent in the process water may be from about 100 ppm to about 5,000 ppm, from about 100 ppm to about 4,000 ppm, from about 200 ppm to about 5,000 ppm, from about 300 ppm to about 5,000 ppm, from about 400 ppm to about 5,000 ppm, from about 50 ppm to about 500 ppm, from about 100 ppm to about 500 ppm, from about 200 ppm to about 500 ppm, from about 300 ppm to about 500 ppm, from about 400 ppm to about 500 ppm, any other sub-range between about 50 ppm and about 5,000 ppm, or any other amount determined to be effective to reduce, eliminate, or substantially eliminate VFA.

In some aspects, the control agent consists essentially of a biocide, sodium bisulfite, a carbamate, or a mixture thereof. In some aspects, the control agent consists of sodium bisulfite. In some aspects, the control agent consists of a carbamate.

If a control agent consists essentially of sodium bisulfite or a carbamate, some examples of components that would, in some embodiments, be considered to materially affect the basic and novel characteristics of the claimed invention include fountain solutions (or certain components thereof), coating compositions/solutions (or certain components thereof), vinyl polymers, dispersable polymers, water-soluble polymers, waxes, pH buffering agents such as organic and inorganic acids or salts thereof, surfactants, chlorite salts, chlorate salts, and enzymes. Illustrative, non-limiting examples of components that would not be considered to materially affect the basic and novel characteristics of the claimed invention include additional chelants and/or water.

In some aspects, an aqueous solution comprises, consists of, or consists essentially of the control agent. In some aspects, the aqueous solution comprises, consists of, or consists essentially of from about 1% to about 99.9%, by weight, of the control agent. In some aspects, the aqueous solution comprises, consists of, or consists essentially of from about 1% to about 75%, from about 1% to about 50%, from about 1% to about 40%, from about 1% to about 30%, from about 1% to about 20%, or from about 1% to about 10%, by weight, of the control agent. In some aspects, the aqueous solution comprises, consists of, or consists essentially of from about 10% to about 45%, from about 15% to about 45%, from about 20% to about 45%, or from about 25% to about 45%, by weight, of the control agent.

In some aspects, the aqueous solution comprises, consists of, or consists essentially of more than 50% by weight of the control agent. For example, in some aspects, the aqueous solution comprises, consists of, or consists essentially of more than about 55%, more than about 60%, or more than about 65%, by weight, of the control agent. In some aspects, the aqueous solution comprises, consists of, or consists essentially of from about 55% to about 99.9%, from about 55% to about 90%, from about 55% to about 80%, from about 55% to about 70%, or from about 55% to about 60%, by weight, of the control agent.

In some aspects, the method further includes adding a chelant to the process water. Examples of chelants include, but are not limited to, ethylenediamine, ethylenediamine tetraacetic acid (EDTA), a porphyrin, a porphine derivative, diethylene-triamine-pentaacetic acid (DTPA), ethylene glycol bis(2-aminoethyl ether)-N, N, N',N'-tetraacetic acid (EGTA), diethylenetriaminepentaacetic acid (DTPA), N-(2-Hydroxyethyl) ethylene diamine-N,N',N'-triacetic acid (HEDTA), polyacrylic acid (PAA), boric acid (BA), sodium tripolyphosphate (STP), an alkoxyacetic acid, trimercapto-triazine, potassium thiocarbonate, sodium thiocarbonate, and dithiocarbamate.

The methods of the present disclosure may be used to control VFA in any aqueous environment/system. In some embodiments, the aqueous environment is an aqueous industrial system. The term "aqueous industrial system" refers to any system that circulates water as a primary ingredient. Non-limiting examples of "aqueous industrial systems" include cooling systems, boiler systems, heating systems, membrane systems, papermaking systems, or any other systems that circulate water. The inventive method can control VFA in any environment comprising bacteria capable of producing VFA. The inventive method can control VFA produced by bacteria.

In some embodiments, the presently disclosed control agent can inhibit formation of the VFA by at least 15%. For example, the control agent can inhibit formation of the VFA by greater than about 30%, greater than about 40%, greater than about 65%, greater than about 100%, or greater than about 200%. In some embodiments, the control agent inhibits formation of VFA by about 15% to greater than about 200%, by about 30% to greater than about 200%, by about 40% to greater than about 200%, by about 65% to greater than about 200%, or by about 100% to greater than about 200%.

In certain embodiments, the aqueous industrial system is papermaking process water. In certain embodiments, the aqueous industrial system is a wastewater stream.

In some embodiments, a paper mill comprises the aqueous industrial system. The paper mill may be, for example, a recycled packaging paper mill. In some embodiments, the paper mill has a closed water loop and the control agent is added to the process water in the closed water loop.

The control agent may be added at any location found throughout a papermaking process and/or to any stream found throughout a papermaking process. For example, the control agent may be added to the thick stock, the process water and/or to the pulp slurry. In some embodiments, the control agent may be added at any location in the wet end of the paper machine, such as in the forming section. Other locations for addition include, but are not limited to, the pulper, stock tank, machine chest, the head box inlet stream, the recovered stock tank, the machine water tank, the clarified water tank, and any combination thereof.

In some aspects, the control agent is added to a stream selected from the group consisting of a pulp slurry, a process water, a shower water, a thick stock, and any combination thereof.

In some aspects, the process water is not aerated or contacted with an oxygen enriched gas mixture. As used herein, aerated process water includes water that exposed to an apparatus that forces air through the water. For example, a bubble column is a common apparatus used to aerate process water for purposes of increasing dissolved oxygen in the water. In some aspects, the aqueous industrial system does not include a bubble column. For purposes of this application, non-aerated water does not exclude water that is in contact with air, incidentally.

In other aspects, a method of controlling a volatile fatty acid in an aqueous industrial system is provided. The method includes determining conductivity of process water in the aqueous industrial system; and adding an effective amount of a control agent to the process water, if the determined level of the conductivity is above a predetermined level. The control agent is selected from the group consisting of a biocide, sodium bisulfite, a carbamate, and any combination thereof.

The predetermined level of conductivity can be a value that correlates with a maximum allowable VFA concentration. The predetermined level of conductivity can be about 1 µS/cm, about 2 µS/cm, about 3 µS/cm, about 4 µS/cm, about 5 µS/cm, about 6 µS/cm, about 7 µS/cm, about 8 µS/cm, about 9 µS/cm, or about 10 µS/cm. The predetermined level of dissolved oxygen can be any value ranging from about 1 µS/cm to about 10 µS/cm, from about 1 µS/cm to about 15 µS/cm, from about 1 µS/cm to about 20 µS/cm, or from about 1 µS/cm to about 100 µS/cm.

A method of monitoring and controlling volatile fatty acid content in process water is provided. The method includes (a) providing a monitoring and controlling unit comprising a controller and a dissolved oxygen sensor in communication with the controller, wherein the dissolved oxygen sensor is operable to measure dissolved oxygen of the process water; (b) providing a chemical injection pump, which is in communication with the controller; (c) inputting an acceptable range for the dissolved oxygen to be measured into the controller; (d) providing a delivery conduit having a first end submerged in the process water and a second end connected to an inlet of the monitoring and controlling unit; (e) delivering a sample of the process water through the delivery conduit into the monitoring and controlling unit; (f) measuring the dissolved oxygen of the sample of the process water with the dissolved oxygen sensor; (g) determining if the measured dissolved oxygen of the sample of process water is within the acceptable range inputted into the controller in step (c); (h) causing a change in an influx of a control agent into the process water from the chemical injection pump if the measured dissolved oxygen is outside of the acceptable range inputted into the controller in step (c), the control agent being capable of adjusting the dissolved oxygen in the process water within the acceptable range; and (i) optionally repeating steps (a) to (g) to determine if the dissolved oxygen has been brought within the acceptable range inputted in step (c).

Still further, another method of monitoring and controlling volatile fatty acid content in process water is provided. The method includes (a) providing a monitoring and controlling unit comprising a controller and a conductivity sensor in communication with the controller, wherein the conductivity sensor is operable to measure conductivity of the process water; (b) providing a chemical injection pump, which is in communication with the controller; (c) inputting an acceptable range for the conductivity to be measured into the controller; (d) providing a delivery conduit having a first end submerged in the process water and a second end connected to an inlet of the monitoring and controlling unit; (e) delivering a sample of the process water through the delivery conduit into the monitoring and controlling unit; (f) measuring the conductivity of the sample of the process water with the conductivity sensor; (g) determining if the measured conductivity of the sample of process water is within the acceptable range inputted into the controller in step (c); (h) causing a change in an influx of a control agent into the process water from the chemical injection pump if the measured conductivity is outside of the acceptable range inputted into the controller in step (c), the control agent being capable of adjusting the conductivity in the process water within the acceptable range; and (i) optionally repeating steps (a) to (g) to determine if the conductivity has been brought within the acceptable range inputted in step (c).

The present disclosure also describes an on-line unit and system for measuring, controlling, and/or optimizing one or more system parameters or properties of water. Optimization can include, for example, measuring one or more properties associated with the water to be sure that the one or more properties are within an acceptable, predetermined range and, if the one or more properties are not within the acceptable, predetermined range for each respective property being measured, causing a change in the water to bring the property back within the acceptable, predetermined range.

In certain embodiments, the system includes a monitoring and controlling unit that comprises a controller and a plurality of sensors. Each of the plurality of sensors can be in communication with the controller. For example, if the unit comprises five sensors, each of the five sensors can be in communication with the controller. In certain aspects, the controller can be attached to a skid, or other type of support member, to allow for mobility.

As used herein, the term "controller" refers to a manual operator or an electronic device having components, such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components.

The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, and/or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components, such as a signal conditioner or system monitor, may be included to facilitate signal transmission and signal-processing algorithms.

In certain aspects, the controller includes hierarchy logic to prioritize any measured or predicted properties associated with system parameters. For example, the controller may be programmed to prioritize system conductivity over pH, or vice versa. It should be appreciated that the object of such hierarchy logic is to allow improved control over the system parameters and to avoid circular control loops.

In some embodiments, the monitoring and controlling unit and method associated therewith includes an automated controller. In some embodiments, the controller is manual or semi-manual. For example, when the system includes one or more datasets received from various sensors in the system, the controller may either automatically determine which data points/datasets to further process or an operator may partially or fully make such a determination. A dataset for an industrial body of water, for instance, may include variables or system parameters such as oxidation/reduction potential (ORP), dissolved oxygen, conductivity, pH, turbidity, concentrations of certain chemicals, such as biocides, scale inhibitors, friction reducers, acids, bases, and/or oxygen scavengers, levels of ions (e.g., determined empirically, automatically, fluorescently, electrochemically, colorimetrically, measured directly, calculated), temperature, pressure, flow rate, total dissolved or suspended solids, etc. Such system parameters are typically measured with any type of suitable data capturing equipment, such as sensors designed specifically for these parameters, e.g., pH sensors, ion analyzers, temperature sensors, thermocouples, pressure sensors, corrosion probes, and/or any other suitable device or sensor. Data capturing equipment is in communication with the controller and, according to some embodiments, may have advanced functions (including any part of the control algorithms described herein) imparted by the controller.

The monitoring and controlling unit may comprise a plurality of sensors, which are capable of analyzing the water and transmitting data regarding the water to the controller. The plurality of sensors can comprise, for example, sensors for measuring conductivity, pH, ORP, biocide concentration, turbidity, temperature, flow, and dissolved oxygen in the water. The monitoring and controlling unit may comprise any of these sensors, all of these sensors, a combination of two or more of these sensors, one or more additional sensors not specifically mentioned here, and the sensors may be in communication with the controller. Other types of sensors contemplated by the present disclosure include, but are not limited to, oil in water sensors, total dissolved solids sensors, and total suspended solids sensors.

The presently disclosed monitoring and controlling system comprises, in certain embodiments, one or more chemical injection pumps. Each chemical injection pump may be in fluid communication with a storage device. Each storage device may comprise one or more chemicals and the chemical injection pumps may transport those chemicals into the body of water. In some embodiments, the chemical injection pump comprises the storage device. The chemical injection pumps may be in communication with the controller in any number of ways, such as through any combination of wired connection, a wireless connection, electronically, cellularly, through infrared, satellite, or according to any other types of communication networks, topologies, protocols, standards and more. Accordingly, the controller can send signals to the pumps to control their chemical feed rates.

In certain embodiments, the monitoring and controlling system is implemented to have the plurality of sensors provide continuous or intermittent feedback, feed-forward, and/or predictive information to the controller, which can relay this information to a relay device, such as the Nalco Global Gateway, which can transmit the information via cellular communications to a remote device, such as a cellular telephone, computer, and/or any other device that can receive cellular communications. This remote device can interpret the information and automatically send a signal (e.g. electronic instructions) back, through the relay device, to the controller to cause the controller to make certain adjustments to the output of the pumps. The information can also be processed internally by the controller and the controller can automatically send signals to the pumps to adjust the amount of chemical injection, for example. Based upon the information received by the controller from the plurality of sensors or from the remote device, the controller may transmit signals to the various pumps to make automatic, real-time adjustments, to the amount of chemical that the pumps are injecting into the water.

Alternatively, an operator of the remote device that receives cellular communications from the controller can manually manipulate the pumps through the remote device. The operator may communicate instructions, through the remote device, cellularly or otherwise, to the controller and the controller can make adjustments to the rate of chemical addition of the chemical injection pumps. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemical being added to the water by one or more of the injection pumps, or any combination of the foregoing. The controller and/or the remote device is also capable of making any of the foregoing adjustments or modifications automatically without the operator actually sending or inputting any instructions. Preset parameters or programs are entered into the controller or remote device so that the controller or remote device can determine if a measured property is outside of an acceptable range. Based on the information received by the plurality of sensors, the controller or remote device can make appropriate adjustments to the pumps or send out an appropriate alert.

In certain embodiments, the remote device or controller can include appropriate software to receive data from the plurality of sensors and determine if the data indicates that one or more measured properties of the water are within, or outside, an acceptable range. The software can also allow the controller or remote device to determine appropriate actions that should be taken to remedy the property that is outside of the acceptable range. For example, if the measured dissolved oxygen is above the acceptable range, the software allows the controller or remote device to make this determination and take remedial action, such as alerting a pump to increase the flow of control agent into the body of water.

The monitoring and controlling system and/or controller disclosed herein can incorporate programming logic to convert analyzer signals from the plurality of sensors to pump adjustment logic and, in certain embodiments, control one or more of a plurality of chemical injection pumps with a unique basis. Non-limiting, illustrative examples of the types of chemical injection pumps that can be manipulated include chemical injection pumps responsible for injecting the control agent. Other chemicals that can be injected include biocides, scale inhibitors, friction reducers, acids, bases, sulfites, oxygen scavengers, and any other type of chemical that could prove to be useful in the particular aqueous industrial system. Particular examples of biocides, scale inhibitors, friction reducers, acids, bases, sulfites, and oxygen scavengers are all well-known in the art and all examples of such chemicals are within the scope of the present disclosure.

The sensors disclosed herein are operable to sense and/or predict a property associated with the water or system parameter and convert the property into an input signal, e.g., an electric signal, capable of being transmitted to the controller. A transmitter associated with each sensor transmits the input signal to the controller. The controller is operable to receive the transmitted input signal, convert the received input signal into an input numerical value, analyze the input numerical value to determine if the input numerical value is within an optimum range, generate an output numerical value, convert the output numerical value into an output signal, e.g., an electrical signal, and transmit the output signal to a receiver, such as a pump incorporating such receiver capabilities or a remote device, such as a computer or cellular telephone, incorporating receiver capabilities. The receiver receives the output signal and either alerts an operator to make adjustments to flow rates of the pumps, or the receiver can be operable to cause a change in a flow rate of the pumps automatically, if the output numerical value is not within the acceptable range for that property.

The method is optionally repeated for a plurality of different system parameters, where each different system parameter has a unique associated property, or, alternatively, all system parameters can be analyzed concurrently by the plurality of sensors.

Data transmission of measured parameters or signals to chemical pumps, alarms, remote monitoring devices, such as computers or cellular telephones, or other system components is accomplished using any suitable device, and across any number of wired and/or wireless networks, including as examples, WiFi, WiMAX, Ethernet, cable, digital subscriber line, Bluetooth, cellular technologies (e.g., 2G, 3G, Universal Mobile Telecommunications System (UMTS), GSM, Long Term Evolution (LTE), or more) etc. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used.

As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

In some embodiments, system parameter information is received from the system and archived. In certain embodiments, system parameter information is processed according to a timetable or schedule. In some embodiments, system parameter information is immediately processed in real-time or substantially real-time. Such real-time reception may include, for example, "streaming data" over a computer network.

The chemicals to be added to the system may be introduced to the system using any suitable type of chemical injection pump. Most commonly, positive displacement injection pumps are used and are powered either electrically or pneumatically. Continuous flow injection pumps can also be used to ensure specialty chemicals are adequately and accurately injected into the rapidly moving process stream. Though any suitable pump or delivery system may be used, exemplary pumps and pumping methods include those disclosed in U.S. Pat. No. 5,066,199, titled "Method for Injecting Treatment Chemicals Using a Constant Flow Positive Displacement Pumping Apparatus" and U.S. Pat. No. 5,195,879, titled "Improved Method for Injecting Treatment Chemicals Using a Constant Flow Positive Displacement Pumping Apparatus," each incorporated herein by reference in its entirety.

In some embodiments, changes in the chemical injection pumps are limited in frequency. In some aspects, adjustment limits are set at a maximum of 1 per 15 min and sequential adjustments in the same direction may not exceed 8, for example. In some embodiments, after 8 total adjustments or a change of 50% or 100%, the pump could be suspended for an amount of time (e.g., 2 or 4 hours) and alarm could be triggered. If such a situation is encountered, it is advantageous to trigger an alarm to alert an operator. Other limits, such as maximum pump output, may also be implemented. It should be appreciated that it is within the scope of the invention to cause any number of adjustments in any direction without limitation. Such limits are applied as determined by the operator or as preset into the controller.

In accordance with certain embodiments of the present disclosure, a method of monitoring and controlling VFA concentration of an aqueous industrial system is provided. The properties can be, for example, dissolved oxygen and/or conductivity.

The method includes the use of a monitoring and controlling unit comprising a controller and a plurality of sensors in communication with the controller. Each of the plurality of sensors is operable to measure a property of the water. For example, in some embodiments, the unit comprises two sensors, wherein each sensor is operable to measure a different property, such as dissolved oxygen and conductivity.

One or more pumps, which are in communication with the controller, are utilized to inject various chemicals into the water, such as the control agents described herein. Each chemical may have its own chemical injection pump.

An acceptable range for each of the dissolved oxygen and/or conductivity of the water to be measured is entered into the controller.

A conduit may be provided between the aqueous industrial system and the monitoring and controlling unit. A sample of water passes through the conduit and into an inlet of the monitoring and controlling unit. Next, the dissolved oxygen or conductivity of the water are measured using a plurality of sensors and the controller determines if the measured dissolved oxygen or conductivity are within the acceptable range entered into the controller in the previous step. This determining step can be automatically performed by the controller and in this step, the measured value for each measured property is compared to the acceptable range entered for that specific property.

If the measured dissolved oxygen and/or conductivity are outside of the acceptable range associated with that property, the controller and/or operator of the controller may cause a change, for example, in an influx of a chemical into the aqueous industrial system from the one or more chemical injection pumps, the chemical(s) being capable of adjusting the measured property and bringing it back within the acceptable range. The controller is operable to determine when the measured property is back within the acceptable range and subsequently turn off the chemical injection pump(s).

EXAMPLES

When biocide was dosed at 12 cycles/day (about 50 ppm/cycle), the DO goes below about 2 ppm while the Butyric Acid level drops following this change. At 3/15 the dosage was reduced back to 6 cycles/day (about 50 ppm/cycle) (FIG. 1).

Figure 2:
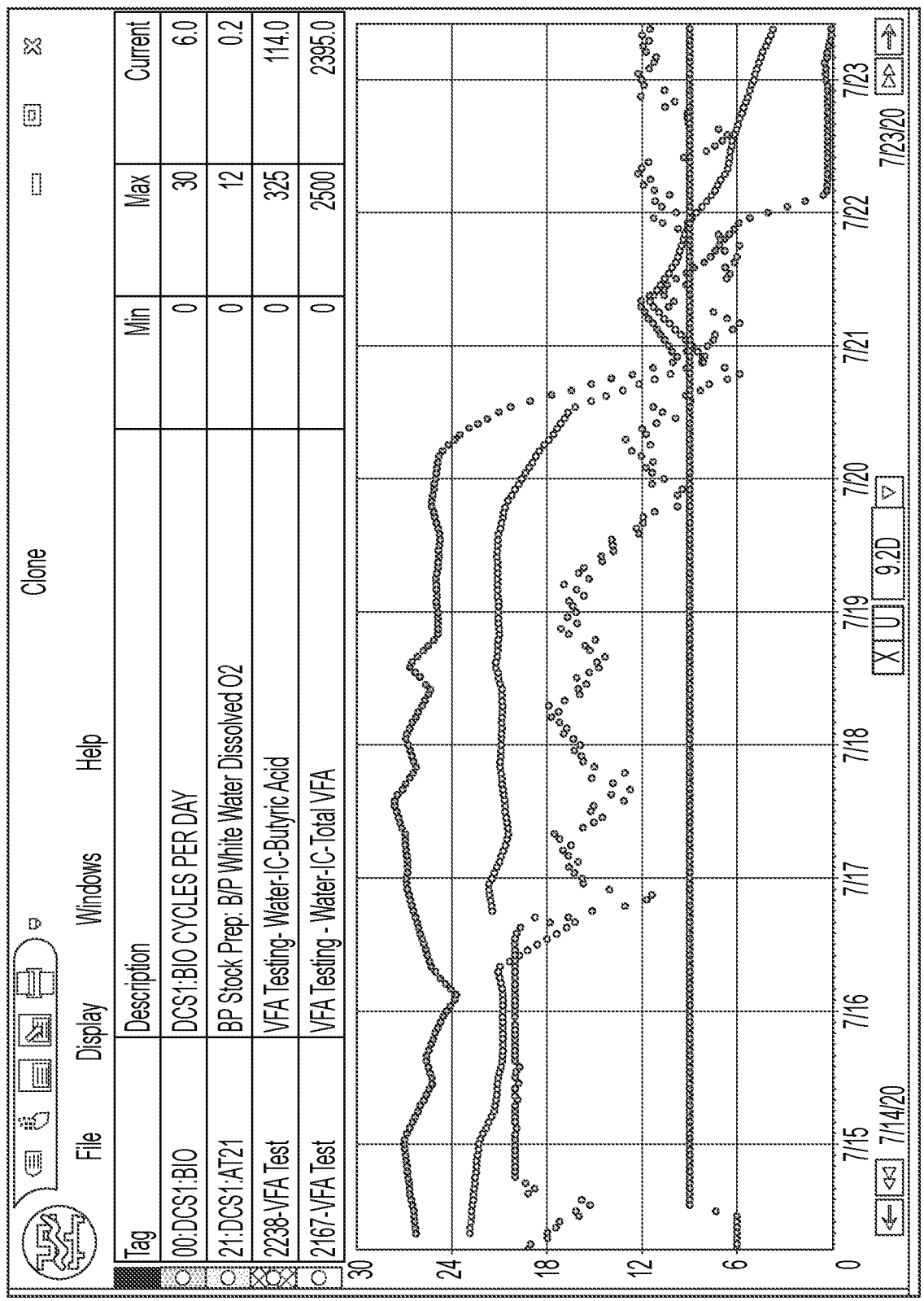
FIG. 2 shows VFA concentration and dissolved oxygen concentration as a control agent is added to the water.

FIG. 2 shows that at 10 cycles/day (about 50 ppm/cycle) the mill DO decreases below 4 ppm while simultaneously the Butyric Acid level drops<10 ppm.

Figure 3:
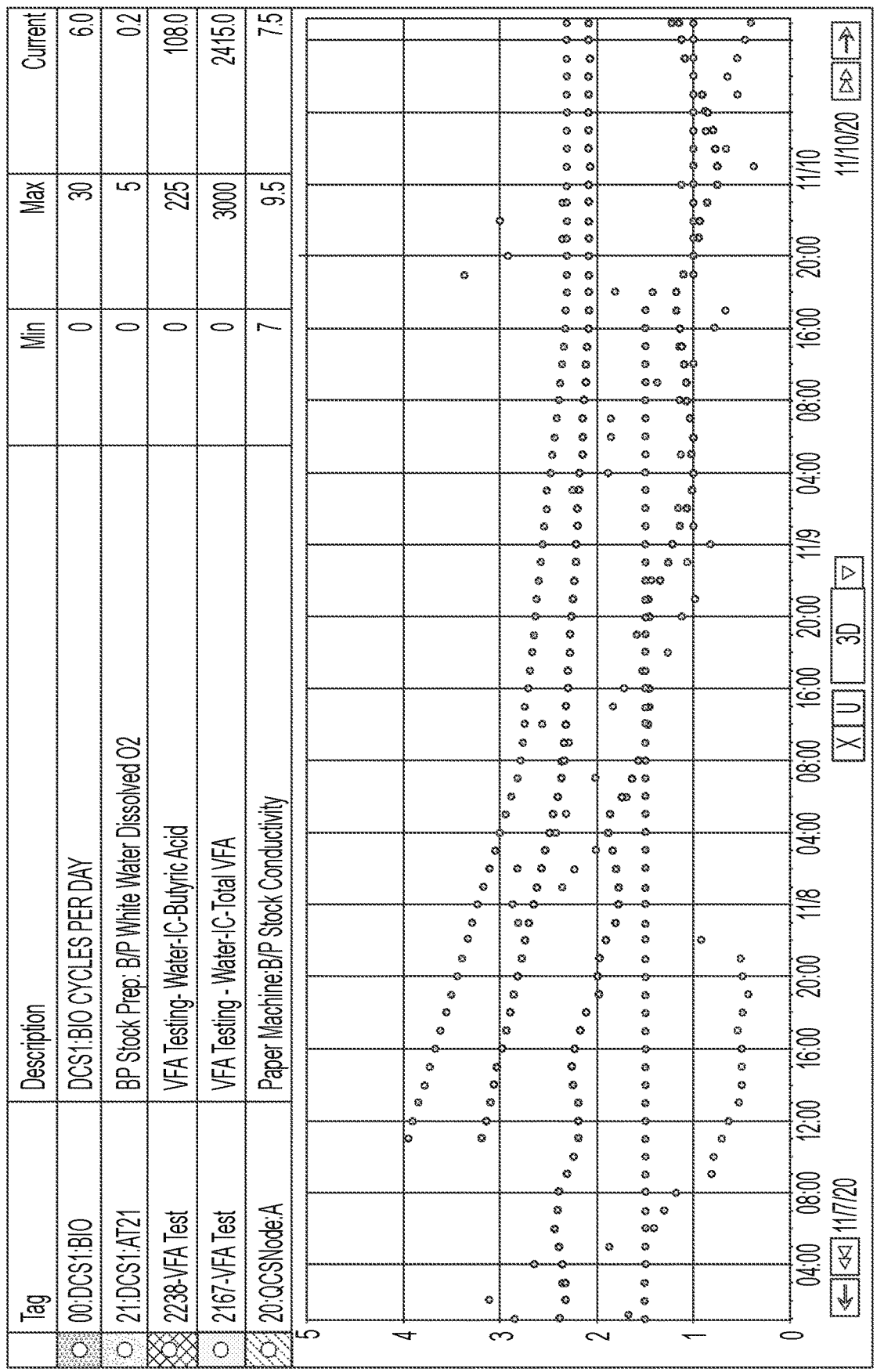
FIG. 3 shows VFA concentration and conductivity levels as a control agent is added to the water.

In this test (FIG. 3), the Biocide cycles were increased to 9 cycles/day (about 50 ppm/cycle) and you can see the conductivity trend down in conjunction with butyric acid concentration. The conductivity measurement was taken from an online probe inserted in the Process Piping giving a continuous measurement. The Mill water DO trends down below about 3 ppm, hence we saw the lowest VFA levels. The continuous DO measurement is from a Hach online DO meter. The Biocide dosage was lowered back to 6 cycles/day (about 50 ppm/cycle) once the butyric acid level was at targeted value (right side of graph).

Figure 4:
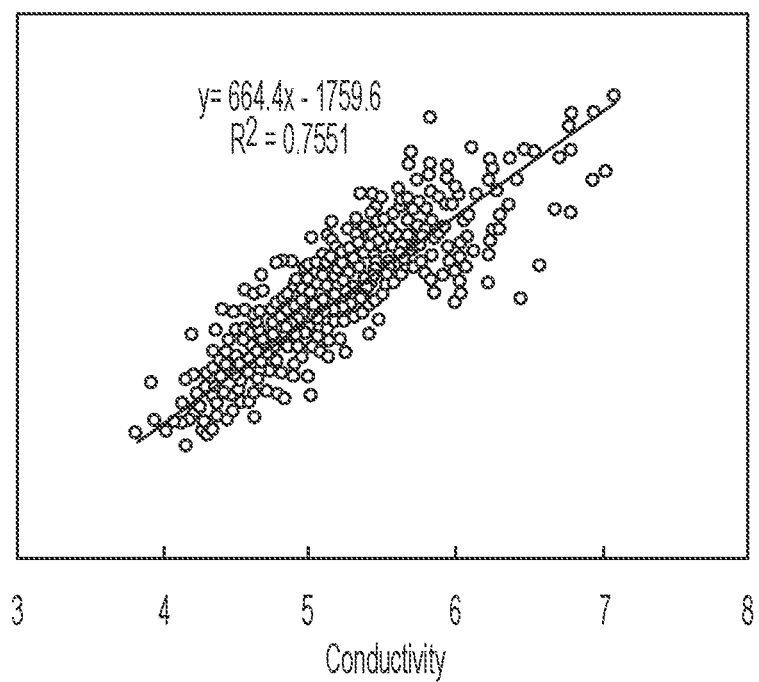
FIG. 4 shows a plot of VFA concentration versus conductivity data from samples of paper mill process water.

FIG. 4 shows conductivity and VFA concentration measurements of paper mill process water over a period of 5 years. The graph shows a correlation between VFA concentration and conductivity. Total VFA (ppm)=664.4*conductivity−1760.1

Figure 5:
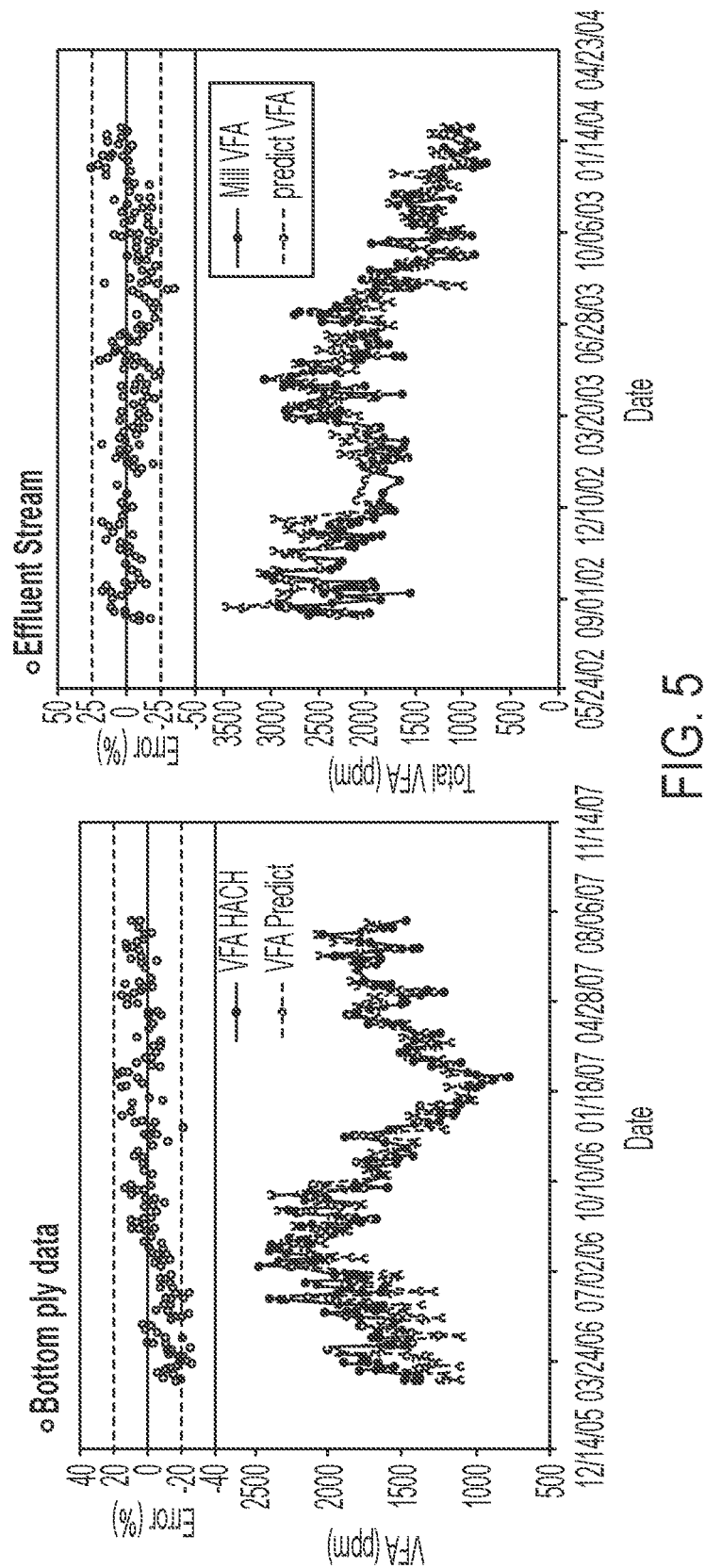
FIG. 5 shows predicted VFA and actual VFA concentration for streams using the model derived from the data in FIG. 4.

FIG. 5 shows that the linear model developed from the data in FIG. 4 accurately predicts VFA concentration in process water.

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 5% of the cited value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

In addition, unless expressly stated to the contrary, use of the term "a" is intended to include "at least one" or "one or more." For example, "a chelant" is intended to include "at least one chelant" or "one or more chelants."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:
1. A method of reducing a volatile fatty acid in an aqueous industrial system, comprising:
   determining a level of dissolved oxygen in process water in the aqueous industrial system with a dissolved oxygen sensor; and adding an effective amount of a control agent to the process water, thereby reducing the level of dissolved oxygen in the process water, and reducing a concentration of a volatile fatty acid in the process water, wherein the level of dissolved oxygen in the process water is measured before, during, and after adding the control agent, and wherein the control agent is selected from the group consisting of a biocide, sodium bisulfite, a carbamate, and any combination thereof.

2. The method of claim 1, wherein determining a level of dissolved oxygen comprises: (a) inserting the dissolved oxygen sensor into the aqueous industrial system; (b) contacting the sensor with the process water; (c) measuring the dissolved oxygen in the process water to obtain an input signal; (d) transmitting the input signal to a controller; and (e) converting the input signal into a numerical value representing the level of dissolved oxygen in the process water.

3. The method of claim 1, wherein adding an effective amount of a control agent to the process water comprises adding the control agent when the level of dissolved oxygen is greater than about 1 ppm.

4. The method of claim 1, wherein the volatile fatty acid is selected from the group consisting of formic acid, acetic acid, butyric acid, propionic acid, isobutyric acid, valeric acid, isovaleric acid, and any combination thereof.

5. The method of claim 1, wherein a paper mill comprises the aqueous industrial system.

6. The method of claim 5, wherein the control agent is added to a stream selected from the group consisting of a pulp slurry, a process water, a shower water, a thick stock, and any combination thereof.

7. The method of claim 5, wherein the control agent is added to a location selected from the group consisting of a water clarifier inlet, a water clarifier outlet, a stock tank, a machine chest, a head box inlet stream, a recovered stock tank, a machine water tank, a save all, and any combination thereof.

8. The method of claim 5, wherein the paper mill is a recycled packaging paper mill.

9. The method of claim 5, wherein the paper mill comprises a closed water loop.

10. The method of claim 1, wherein the control agent inhibits the formation of the volatile fatty acid in the aqueous industrial system as compared to an aqueous industrial system that was not treated with the control agent, and wherein the volatile fatty acid is selected from the group consisting of formic acid, acetic acid, butyric acid, propionic acid, isobutyric acid, valeric acid, isovaleric acid, and any combination thereof.

11. The method of claim 1, further comprising adding a chelant to the process water, wherein the chelant is selected from the group consisting of ethylenediamine, ethylenediamine tetraacetic acid (EDTA), a porphyrin, a porphine derivative, diethylene-triamine-pentaacetic acid (DTPA), ethylene glycol bis(2-aminoethyl ether)-N,N,N',N'-tetraacetic acid (EGTA), diethylenetriaminepentaacetic acid (DTPA), N-(2-Hydroxyethyl) ethylene diamine-N,N',N'-triacetic acid (HEDTA), polyacrylic acid (PAA), boric acid (BA), sodium tripolyphosphate (STP), an alkoxyacetic acid, trimercaptotriazine, potassium thiocarbonate, sodium thiocarbonate, a dithiocarbamate, and any combination thereof.

12. The method of claim 1, wherein the effective amount is from about 1 ppm to about 500 ppm.

13. The method of claim 1, wherein the process water is not aerated or contacted with an oxygen enriched gas mixture.

14. The method of claim 1, further comprising decreasing a population of acid-producing bacteria, increasing a population of nitrate-reducing bacteria, or a combination thereof.

15. The method of claim 1, wherein adding the effective amount of the control agent to the process water comprises adding the control agent when the level of dissolved oxygen is less than about 10 ppm.

16. The method of claim 15, further comprising repeating the step of adding the effective amount of the control agent to the process water until the level of dissolved oxygen is lower than about 5 ppm.

17. A method of monitoring and reducing volatile fatty acid content in process water comprising:
(a) providing a monitoring and controlling unit comprising a controller and a dissolved oxygen sensor in communication with the controller, wherein the dissolved oxygen sensor is operable to measure dissolved oxygen of the process water;
(b) providing a chemical injection pump, which is in communication with the controller;
(c) providing a delivery conduit having a first end submerged in the process water and a second end connected to an inlet of the monitoring and controlling unit;
(d) delivering a sample of the process water through the delivery conduit into the monitoring and controlling unit;
(e) measuring the dissolved oxygen of the sample of the process water with the dissolved oxygen sensor; and
(f) adding an effective amount of a control agent into the process water from the chemical injection pump, the control agent thereby reducing the dissolved oxygen in the process water, and reducing the volatile fatty acid content in the process water.

18. The method of claim 17, wherein the monitoring and controlling unit further comprises a conductivity sensor in communication with the controller, wherein the conductivity sensor is operable to measure conductivity of the process water.

19. A method of reducing a volatile fatty acid in an aqueous industrial system, comprising:
determining conductivity of process water in the aqueous industrial system;
adding an effective amount of a control agent to the process water, thereby reducing the conductivity in the process water, and reducing a concentration of a volatile fatty acid in the process water,
wherein the conductivity in the process water is measured before, during, and after adding the control agent, and
wherein the control agent is selected from the group consisting of a biocide, sodium bisulfite, a carbamate, and any combination thereof.

20. The method of claim 19, wherein the step of determining conductivity comprises: (a) inserting a probe into the aqueous industrial system; (b) contacting the probe with the process water; (c) measuring the conductivity in the process water to obtain an input signal; (d) transmitting the input signal to a controller; and (e) converting the input signal into a numerical value representing a level of conductivity in the process water.

* * * * *